US008078682B1

(12) United States Patent
Worley et al.

(10) Patent No.: US 8,078,682 B1
(45) Date of Patent: Dec. 13, 2011

(54) METHOD AND SYSTEM FOR MANAGING CONTACT INFORMATION AMONG RELATIONSHIPS

(75) Inventors: Evan Worley, San Diego, CA (US); Jose Alejandro Alvarez, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 305 days.

(21) Appl. No.: 12/253,740

(22) Filed: Oct. 17, 2008

(51) Int. Cl.
*G06F 15/16* (2006.01)
(52) U.S. Cl. ........................................ 709/206; 709/217
(58) Field of Classification Search .................... 709/206
See application file for complete search history.

(56) References Cited

U.S. PATENT DOCUMENTS 7,539,697 B1 * 5/2009 Akella et al. ........................... 1/1
7,822,191 B2 * 10/2010 McKinzie et al. ....... 379/355.07
2006/0224675 A1 * 10/2006 Fox et al. ....................... 709/206
2007/0038720 A1 * 2/2007 Reding et al. .................. 709/217
2008/0148154 A1 * 6/2008 Burrell et al. .................. 715/733
2009/0144375 A1 * 6/2009 Maltempo ...................... 709/206
2009/0240657 A1 * 9/2009 Grigsby et al. ..................... 707/3

* cited by examiner

*Primary Examiner* — Joseph Avellino
*Assistant Examiner* — Jeong S Park
(74) *Attorney, Agent, or Firm* — Osha • Liang LLP

(57) ABSTRACT

A method for managing contact information among relationships. The method involves receiving a notification request comprising contact information for a registered user, identifying an associated entity with which the registered user has a relationship, retrieving a user update preference associated with the registered user and the associated entity, retrieving an entity update preference associated with the associated entity, determining that the user update preference permits sending an update message to the associated entity, and sending the update message to the associated entity, wherein the update message is created and sent based on the contact information, the entity update preference, and the determination that the user update preference permits sending the update message to the associated entity.

22 Claims, 5 Drawing Sheets

METHOD AND SYSTEM FOR MANAGING CONTACT INFORMATION AMONG RELATIONSHIPS

BACKGROUND

Businesses maintain a variety of different relationships amongst their clients, employees, and vendors that they use. Similarly, individuals likely maintain a variety of different relationships amongst their family members, friends, employers, colleagues, and businesses that they frequent. As diverse in nature as those relationships might seemingly be, the relationships all share a communicative element essential to creating and developing a relationship between any two entities. In the interest of fostering a relationship with a second entity, a first entity likely seeks ways that are convenient and effective in facilitating this fundamental communication.

SUMMARY

In general, in one aspect, the invention relates to a method for managing contact information among relationships. The method includes receiving a notification request. The notification request includes contact information for a registered user. The method further includes identifying an associated entity with which the registered user has a relationship, retrieving a user update preference associated with the registered user and the associated entity, retrieving an entity update preference associated with the associated entity, and determining that the user update preference permits sending an update message to the associated entity. The method further includes sending the update message to the associated entity. The update message is created and sent based on the contact information, the entity update preference, and the determination that the user update preference permits sending the update message to the associated entity.

In general, in one aspect, the invention relates to a relationship management service that includes a processor and memory storing software instructions executing on the processor. The relation management service is configured to receive a notification request that includes contact information for a registered user. The relationship management service is further configured to identify a associated entity with which the registered user has a relationship, retrieve a user update preference associated with the registered user and the associated entity, retrieve a entity update preference associated with the associated entity, and determine that the user update preference permits sending a update message to the associated entity. The relationship management service is further configured to send the update message to the associated entity. The update message is created and sent based on the contact information, the entity update preference, and the determination that the user update preference permits sending the update message to the associated entity.

In general, in one aspect, the invention relates to a computer readable medium that includes executable software instructions for managing relationships. The executable software instructions are configured to receive a notification request that includes contact information for a registered user, identify a associated entity with which the registered user has a relationship, retrieve a user update preference associated with the registered user and the associated entity, retrieve a entity update preference associated with the associated entity, determine that the user update preference permits sending a update message to the associated entity, and send the update message to the associated entity. The update message is created and sent based on the contact information, the entity update preference, and the determination that the user update preference permits sending the update message to the associated entity.

Other aspects of the invention will be apparent from the following description and the appended claims.

DETAILED DESCRIPTION

Figure 1:
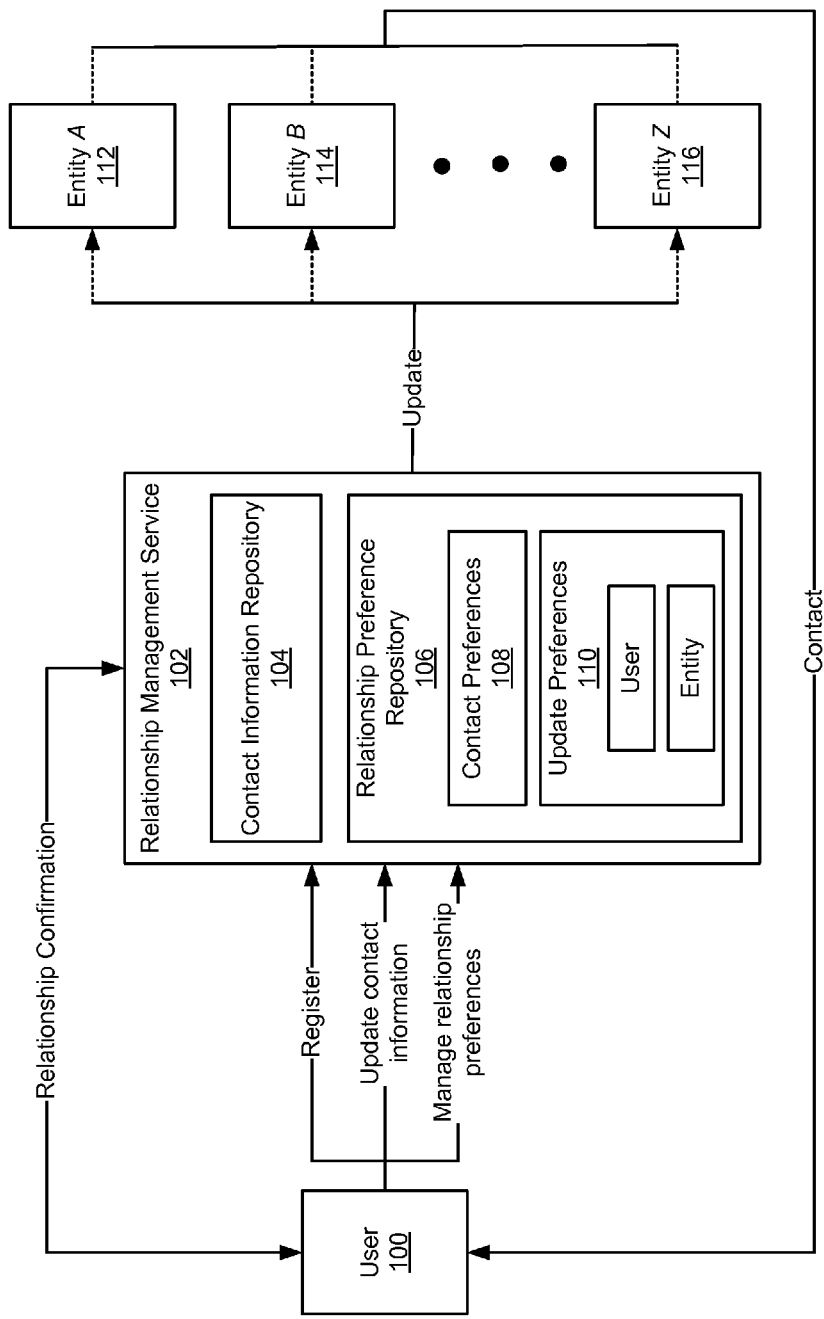
FIG. 1 shows a flow diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for managing contact information among relationships. More specifically, embodiments of the invention are directed to send associated entities with which a user has a relationship an update message including contact information for the user. As update messages are sent whenever the user changes contact information, associated entities with which the user desires to maintain a relationship are timely apprised of current contact information for the user.

In one or more embodiments of the invention, relationships between a user and a particular entity are governed by a set of relationship preferences. Through the adjustment of these relationship preferences, a user may manage aspects of the relationship with an entity. Various details regarding relationship preferences are described below. A contact preference for a user and a particular entity specifies whether the entity is one which the user approves receiving contact from, in addition to the mechanism by which the user prefers receiving that contact. The mechanisms of contact for user may include, but are not limited to, e-mail, telephone, and postal mail. A user update preference for a user and a particular entity specifies whether the entity receives an update message following a change in contact information for the user. An entity update preference for a user and a particular entity specifies requirements for sending the entity an update message; these requirements may include, but are not limited to, procedural and formatting requirements specific to the entity. The relationship preferences may include other preferences not discussed above.

FIG. 1 shows a flow diagram of a system in accordance with one or more embodiments of the invention. The Relationship Management Service (102) is configured to receive requests from a user (100) and interact with one or entities. For example, an unregistered user sends the Relationship Management Service (102) a registration request. Having registered the user, the Relationship Management Service (102) maintains a set of relationship preferences (106) for the user (100) with regards to an associated entity (e.g., Entity A (112), Entity B (114), and/or Entity Z (116)) with which the user (100) maintains a relationship. In one or more embodiments of the invention, the registration request may include contact information, an associated entity (e.g., Entity A (112), Entity B (114), and/or Entity Z (116)) with which the user (100) has a relationship, a user update preference for the user (100) with regards to the associated entity (e.g., Entity A (112), Entity B (114), and/or Entity Z (116)), and a contact preference for the user (100) with regards to the associated entity (e.g., Entity A (112), Entity B (114), and/or Entity Z (116)). Contact information may include a mailing address, a telephone number(s), and an e-mail address(es), etc. In processing the registration request, the Relationship Management Service (102) may also obtain an entity update preference associated with the associated entity (e.g., Entity A (112), Entity B (114), and/or Entity Z (116)).

In one or more embodiments of the invention, a user (100) who sends a registration request is considered registered by the Relationship Management Service (102) once the Relationship Management Service (102) stores contact information, a contact preference, a user update preference, and an entity update preference for the user. Those skilled in the art will appreciate that the Relationship Management Service (102) may consider the user registered without storing all of the aforementioned information.

In one or more embodiments of the invention, the Relationship Management Service (102) is further configured to send update messages to an associated entity (e.g., Entity A (112), Entity B (114), and/or Entity Z (116)) on behalf of the user (100). For example, after receiving a notification request including contact information for a user (100), the Relationship Management Service (102) creates and sends an update message to associated entities that qualify for receiving an update with regards to the particular user. Specifically, the Relationship Management Service (102) uses the user update preference for the user (100) and the associated entity (e.g., Entity A (112), Entity B (114), and/or Entity Z (116)) to determine whether the user (100) specified the associated entity (e.g., Entity A (112), Entity B (114), and/or Entity Z (116)) as an entity qualified to receive update messages from the Relationship Management Service (102) on behalf of the user (100). Having made an affirmative determination to send an update, the Relationship Management Service (102) creates the update message in accordance with the entity update preference for the associated entity (e.g., Entity A (112), Entity B (114), and/or Entity Z (116)).

In one or more embodiments of the invention, the Relationship Management Service (102) includes a Contact Information Repository (104), which is configured to store contact information and a Relationship Preference Repository (106) configured to store relationship preferences (e.g., contact preferences (108), update preferences (110) such as user update preferences, and entity update preferences, etc.). In one or more embodiments of the invention, the contact preferences (108) include the manner (and/or timeliness) in which the user prefers to receive/send contact information. In one or more embodiments of the invention, update preferences (110) include the manner (and/or timeliness) in which the user prefers to send/receive updates associated with contact information. In one or more embodiments of the invention, the entirety of the contact information for a user (100) is sent with the registration request to the Relationship Management Service (102). In one or more embodiments of the invention, the notification request includes only the contact information that has changed. Once the updated contact information is received, the Relationship Management Service updates the stored contact information for the user.

In one or more embodiments of the invention, the Relationship Management Service (102) does not include a Contact Information Repository (104) and does not store contact information for a user (100). In these embodiments, the Relationship Management Service (102) does not maintain a copy of contact information for the registered user; rather, the Relationship Management Service (102) receives the full set of contact information for the registered user from the registered user with each notification request.

In one or more embodiments of the invention, the Relationship Management Service (102) includes a Contact Information Repository (104) configured to store contact information for associated entities (e.g., Entity A (112), Entity B (114), and/or Entity Z (116)) of a user (100), in addition to storing contact information for the user (100) itself. Further, the Relationship Management Service (102) may receive the contact information for the associated entity (e.g., Entity A (112), Entity B (114), and/or Entity Z (116)) when apprised of the relationship itself, (either through a registration request from the user (100) or through an Internet or directory search feature). In one or more other embodiments of the invention, the Relationship Management Service (102) includes a Contact Information Repository (104) configured to store contact information for associated entities (e.g., Entity A (112), Entity B (114), and/or Entity Z (116)) of a user (100) but not contact information for the user (100) itself; accordingly, under these embodiments of the invention, the full set of contact information accompanies notification requests sent to the Relationship Management Service (102), as discussed above.

In one or more embodiments of the invention, the Relationship Management Service (102) is further configured to receive requests from a registered user (100) for modifying user update preferences or contact preferences stored in the Relationship Preference Repository (106). By modifying these relationship preferences, the user (100) may alter communicative aspects of a relationship with an associated entity. Changing a user update preference allows a user to effectively change whether an associated entity is apprised of changes when the user later changes their contact information. By allowing the user (100) to make this notification, the user (100) can selectively maintain some relationships while terminating others. In one or more embodiments of the invention, changing a contact preference allows a user (100) to change whether the user (100) receives communication from an associated entity (e.g., Entity A (112), Entity B (114), and/or Entity Z (116)) in addition to changing the manner by which the associated entity makes that communication. Further, in one or more embodiments of the invention, the Relationship Management Service (102) is further configured to communicate the contact preference specified by a particular user (100) for a particular associated entity to that associated entity (e.g., Entity A (112), Entity B (114), and/or Entity Z (116)). By allowing a user (100) to make the contact preference specification and then allowing the contact preference specification to be made known to the pertinent entity, the Relationship Management Service (102) enables the user to manage the way the Relationship Management Service (102) receives communication from its associated entities.

In one or more embodiments of the invention, the Relationship Management Service (102) enables the discovery of new relationships. In one or more embodiments of the invention, the Relationship Management Service (102) includes functionality to execute a web search to obtain the contact information for a user (100). If any mailing lists or contact lists, for example, are found during such a search then those lists can be processed to uncover newly-discovered relationships between the user (100) and another associated entity.

In one or more embodiments of the invention, the Relationship Management Service (102) screen scrapes data from the displayed output of another program to discover new relationships. For example, a user (100) may be viewing a personal statement over the Internet, such as a monthly phone bill or credit card statement; accordingly, the Relationship Management Service (102) extracts information from the displayed content, such as merchants listed on a credit card statement. In one or other embodiments of the invention, the Relationship Management Service (102) imports data from other software. For example, many e-mail clients, whether web-based or configured as a desktop application, include an address book feature, which could be used for the purpose of discovering new relationship.

In one or more embodiments of the invention, the Relationship Management Service (102) is configured to receive a relationship request from an associated entity. For example, consider a scenario in which a user (100) has a relationship with an associated business entity that is not registered with the Relationship Management Service (102). In such scenarios, the business entity may register with the Relationship Management Service (102) and then specify associated entities (e.g., users) with which the business entity has a relationship. Once these associated entities are identified, an attempt to connect with the user (100) may be made by sending a relationship request specifying the user (100) to the Relationship Management Service (102).

In one or more embodiments of the invention, when a new relationship is discovered by the Relationship Management Service (102) through the methods discussed above, a relationship confirmation request is sent to the user (100) to allow confirmation of the relationship. Once the user (100) has responded affirmatively, the Relationship Management Service (102) obtains an entity update preference for the associated entity (e.g., Entity A (112), Entity B (114), and/or Entity Z (116)) in the newly-discovered relationship. Further, the user (100) is able to specify a user update preference and a contact preference for the associated entity (e.g., Entity A (112), Entity B (114), and/or Entity Z (116)). Subsequently, the user update preference, the entity update preference, and the contact preference are stored and the relationship is registered with the Relationship Management Service (102).

Figure 2:
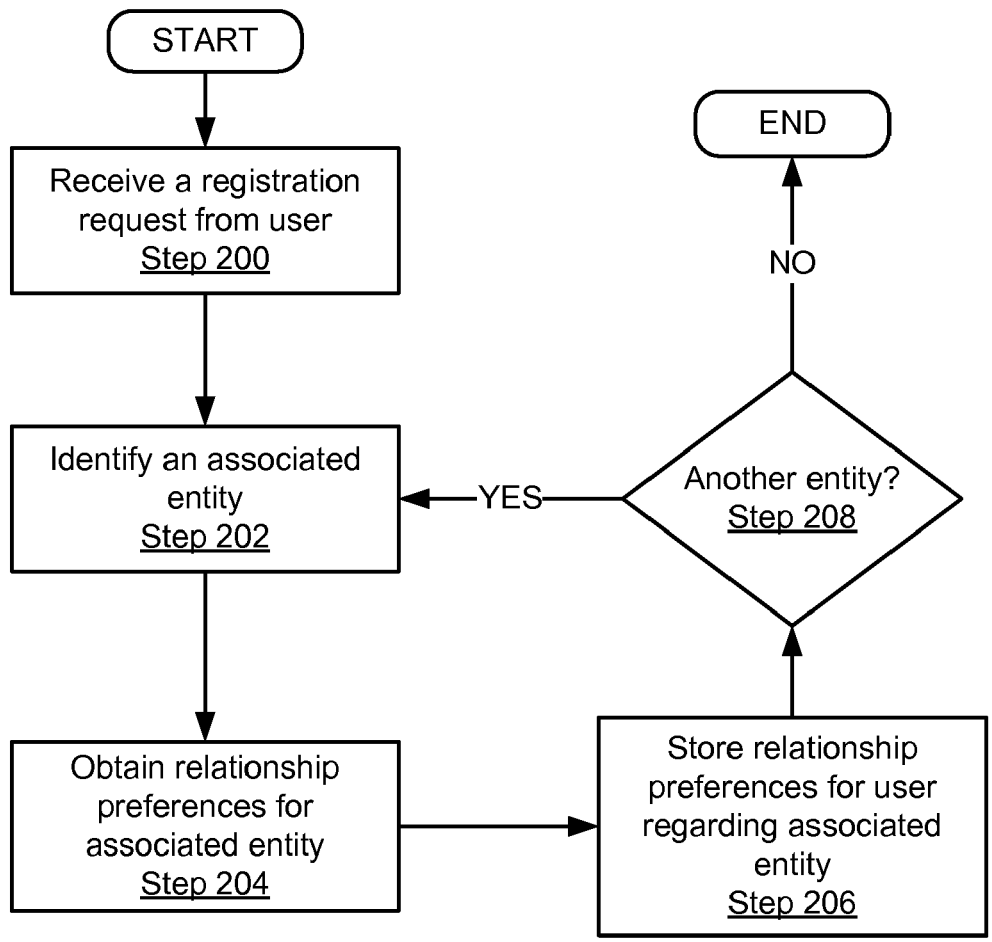
FIGS. 2 and 3 show flowcharts of methods in accordance with one or more embodiments of the invention.
Figure 3:
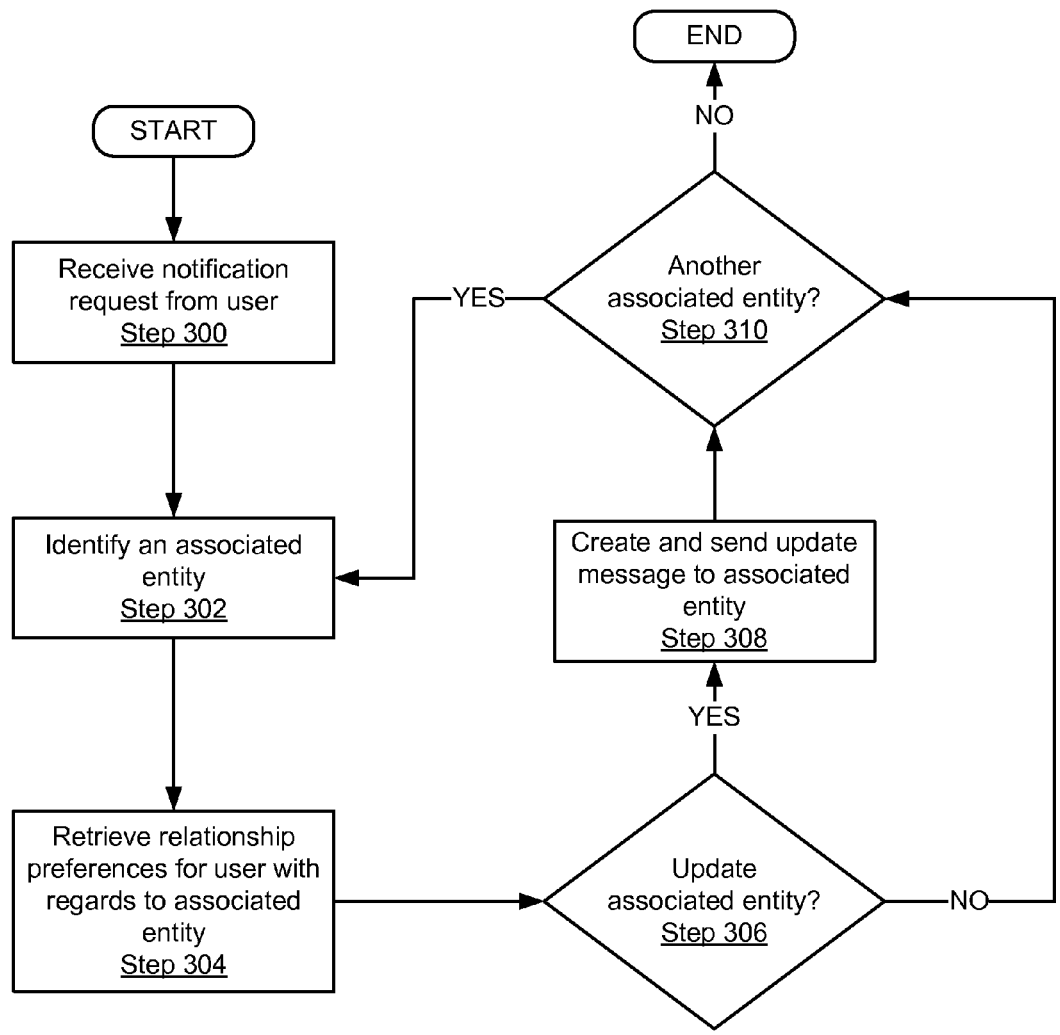

FIGS. 2 and 3 show flowcharts of methods in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 2 shows a flowchart of a method in accordance with one or more embodiments of the invention. The process shown in FIG. 2 may be used, for example, by the Relationship Management Service to register an unregistered user.

In Step 200, a registration request from an unregistered user is received. In one or more embodiments of the invention, the registration request includes a list of associated entities with corresponding user update preferences and contact preferences. In one or other embodiments of the invention, only the list of associated entities is submitted with the registration request. In such cases, the Relationship Management Service may obtain the relationship preferences at a later time.

In Step 202, an associated entity of the unregistered user to process is identified. In one or more embodiments of the invention, associated entities of the user are provided with the registration request; accordingly, one of the provided associated entities are selected to process. In one or more embodiments of the invention, where multiple associated entities exist, Step 202 through Step 208 loop iteratively until the supply of unprocessed associated entities are processed.

In Step 204, the relationship preferences for the associated entity are obtained. Relationship preferences may include, but are not limited to, a contact preference, a user update preference, and an entity update preference.

In one or more embodiments of the invention, the contact preference and user update preference for an associated entity are provided with the registration request in Step 200, and the preferences are extracted from the input information accordingly. In one or more other embodiments of the invention, the user may be prompted for a contact preference and a user update preference through a user interface. In one or more embodiments of the invention, the user is issued a request for, and receives in response, a contact preference and a user update preference.

In one or more embodiments of the invention, an entity update preference is acquired for the associated entity. In one or more embodiments of the invention, the entity update preference is obtained from the associated entity itself. In one or more embodiments of the invention, the entity update preference is obtained from a third-party (e.g., an entity that is not the user not the associated entity).

In Step 206, the obtained relationship preferences for the user with regards to the associated entity are stored. In Step 208, a determination is made whether another associated entity requires processing. If the supply of unprocessed associated entities is not exhausted, the process begins anew for a next associated entity with Step 202; if all associated entities have been processed, registration for the user is complete.

In one or more embodiments of the invention, the Relationship Management Service (102) of FIG. 1 performs one or more of Steps 200-208 outlined above and shown in FIG. 2.

FIG. 3 shows a flowchart of a method in accordance with one or more embodiments of the invention. The process shown in FIG. 3 may be used, for example, to process a notification request from a registered user to update associated entities of updated contact information for the user.

In Step 300, a notification request is received from a registered user. In one or more embodiments of the invention, this notification request includes the entirety of the contact information for the user. In one or more other embodiments of the invention, the notification request includes only the updated contact information for the user.

In Step 302, an associated entity to process is identified. In one or more embodiments of the invention, an associated entity for a particular user is retrieved from a repository, which maps the set of relationship preferences from each user to each associated entity with which the user has a relationship.

In one or more embodiments of the invention, when there are multiple associated entities for a particular user, Step 302 through Step 310 loop iteratively until the supply of unprocessed associated entities is exhausted for the user.

In Step 304, the relationship preferences for the user with regards to the associated entity selected in Step 302 are retrieved, including the user update preference and entity update preference.

In Step 306, a determination is made whether the associated entity is required to receive an update of contact information for the user. The determination is made using the user update preference retrieved in Step 304. If the user update preference indicates the selected associated entity requires updating, then the method proceeds to Step 308; otherwise, the method proceeds to Step 310.

In Step 308, an update message is created and sent to the associated entity. The contact information for the user is used as the content of the update message and the entity update preference retrieved in Step 304 to format the update message according to the processing requirements for the associated entity.

In Step 310, a determination is made whether another associated entity requires processing. If the supply of unprocessed associated entities is not exhausted, the process begins anew for a next associated entity with Step 302; if all associated entities have been processed, then the updating of associated entities for the user is complete.

In one or more embodiments of the invention, the Relationship Management Service (102) of FIG. 1 performs one or more of Steps 300-310 outlined above and shown in FIG. 3.

Figure 4:
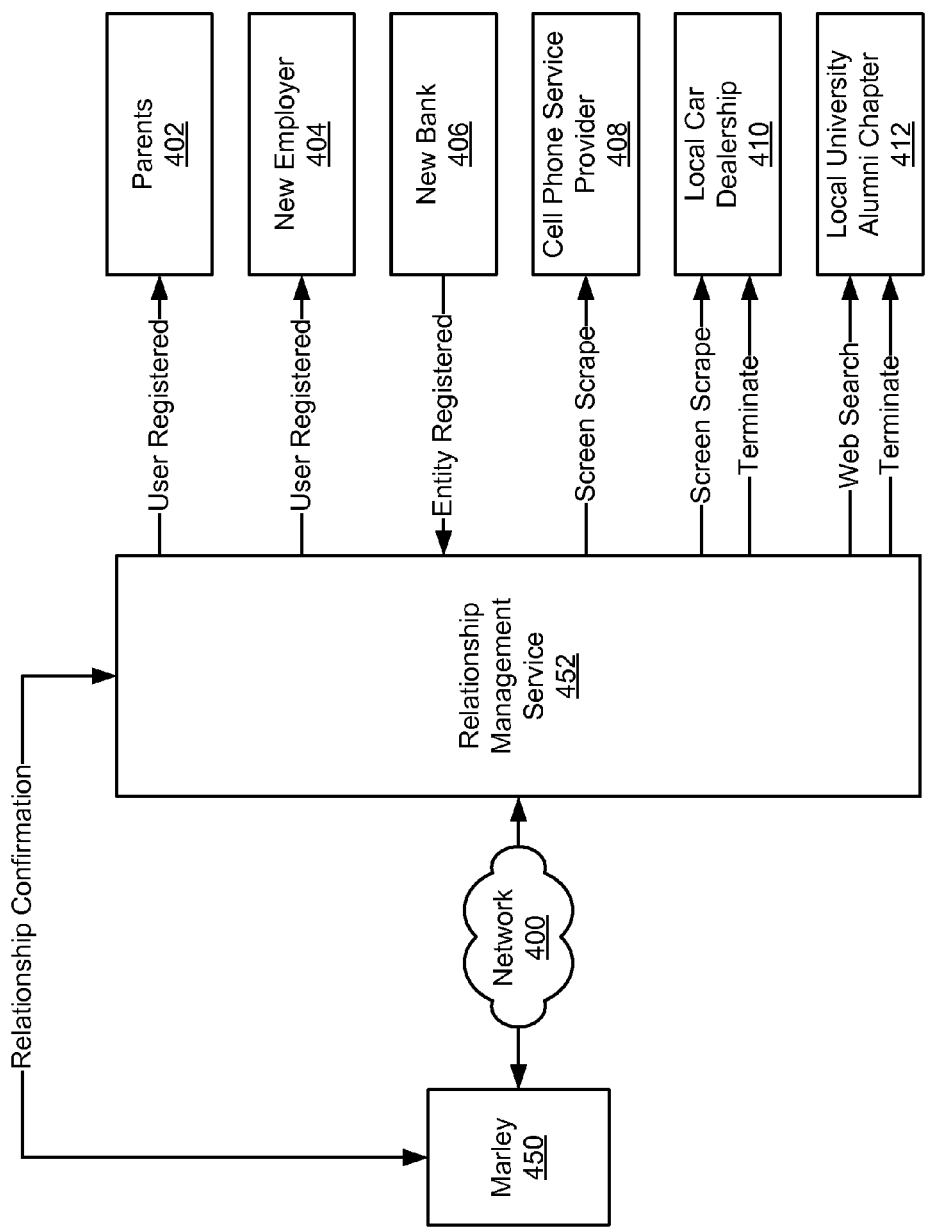
FIG. 4 shows a flow diagram of an exemplary system in accordance with one or more embodiments of the invention.

FIG. 4 shows a flow diagram of an exemplary system in accordance with one or more embodiments of the invention. FIG. 4 aids in providing an illustrative example. The example is not intended to limit the scope of the invention.

After living on the West Coast of the United States of America for half his life, Marley (450) is planning a cross-country move from San Francisco, Calif. to New York City, N.Y. where he plans to begin a new career. In the maelstrom of activity surrounding his relocation, which includes packing, hiring movers, finding a new bank, and gym in New York, and saying his goodbyes to friends and family in San Francisco, Marley (450) is anxious that time may run out, that things may get left behind, and that loose ends may remain. Furthermore, Marley (450) is cognizant of the possibility that some of these issues may not become apparent until after he has relocated to the East Coast.

A complicating factor is the fact that Marley (450) does not have an intended residence established yet in New York City. Due to the sky-high rent prices Marley (450) has encountered, he wants to wait and give himself an opportunity to assess his options upon moving there. For this reason, Marley (450) is staying at a friend's place for at least the first few weeks before committing to a housing option. Given the transient and unsettled nature of his plans, Marley (450) is worried that people and businesses with which he has established relationships will be unable to find him as needed. To ease his mind, Marley (450) decides he needs a system that ensures that everyone who has a good reason for contacting him will be able to do so.

Marley (450) takes a friend's advice and plans on registering with a Relationship Management Service (452). A few days before the move, he sends the Relationship Management Service (452) a registration request. Because Marley (450) is busy and does not have the time to delve into all the relationships to which he is a party, Marley (450) specifies two associated entities in addition to the contact information he has on hand for those entities.

The first relationship Marley (450) registers is with his parents (402), for which he specifies a user update preference that enables the Relationship Management Service (102) to always update his parents (402) upon any changes in his contact information. Further, Marley (450) specifies a contact preference indicating a preference to receive contact from his parents (402) via e-mail and telephone. The second relationship Marley (450) registers is with his new employer (404) in New York City. In specifying the user update preference and contact preference regarding his new employer (404), Marley (450) makes the same selections. Further, until his housing issue is resolved, Marley (450) prefers only to receive communications through e-mail and telephone.

In taking the next step in registering Marley (450) and processing his submitted relationships, the Relationship Management Service (452) obtains the entity update preferences for the two relationships. Having received contact information for Marley's parents (402) and new employer (404) from Marley (450) himself, the Relationship Management Service (452) is able to directly contact the associated entities and acquire the entity update preferences; accordingly, the Relationship Management Service (452) is informed through its correspondence with the respective associated entities that: (i) Marley's parents (402) prefer receiving update messages via e-mail or telephone; and (ii) Marley's new employer (404) prefers receiving update messages via a standardized form maintained by the employer's human resources department. Having obtained a pair of relationships and the corresponding relationship preferences for Marley (450), the Relationship Management Service (452) stores this information.

With registration for Marley (450) now complete, the Relationship Management Service (452) may proceed to perform relationship discovery. By executing a routine web search keying on Marley's identity and contact information, the Relationship Management Service (412) discovers a web-posted contact list (412) for the San Francisco chapter of his university's alumni association. By executing a screen scrape of Marley's web-viewable monthly credit card statement, the Relationship Management Service (412) discovers: (i) the cellular phone service provider (408) with which Marley (450) has an account; and (ii) the Bay-Area car dealership (410) where Marley (450) has routinely had maintenance work done on his car. Further, Relationship Management Service (412) receives a new relationship request, identifying a New York-area bank (406) with which Marley (450) has newly enlisted in preparation of his relocation.

In processing each of these newly discovered relationships, the Relationship Management Service (412) sends Marley (450) a relationship confirmation request. Marley (450) approves relationship confirmation requests for the New York bank (406) and Marley's cell phone service provider (408) as the entities will continue to be relevant in his new life in New York. Accordingly, Marley (450) supplies a contact preference and a user update preference for each: (i) telephone or e-mail communications from the bank (406), with the bank (406) being updated upon changes in Marley's contact information; and (ii) only e-mail communications from the cell phone service provider (408), with the cell phone service provider (408) being updated upon changes in Marley's contact information.

In receiving the affirmative relationship responses, the Relationship Management Service (412) obtains entity update preferences for the bank (406) and cell phone service provider (408). The bank (406) and cell phone service provider (408) both allow for updating of contact information for account holders through their respective secure online form mechanisms over the Internet. Once the Relationship Management Service (412) stores the set of relationship preferences, the relationships are effectively registered for Marley (450). With regards to updating contact information through online form mechanisms, which often require login using a user name and password, the Relationship Management Service (412) can endeavor to semi-automate or fully-automate the update process: (i) in a semi-automated update, the Relationship Management Service (412) obtains the user name from Marley (450) during relationship registration and obtains the password from Marley (450) during update; and (ii) in a fully-automated update, the Relationship Management Service (412) obtains both the user name and password from Marley (450) during relationship registration, thereby enabling a fully-automated update process without further interaction with Marley (450). In this particular instance, Marley (450) opts for a semi-automated update for bank (406) and cell phone service provider (408) and provides only user name information for the respective online form mechanisms.

Returning to the example, Marley (450) opts to terminate his relationships with the Bay-Area car dealership (410) and the San Francisco chapter of his university's alumni association (412); consequently, for those two associated entities (410, 412), the Relationship Management Service (412) stores: (i) a user update preference denying the sending of update messages on behalf of Marley (450); and (ii) a contact preference indicating Marley's preference in not receiving future communications; additionally, the Relationship Management (412) may contact these two associated entities (410, 412) with a request to remove Marley's contact information from their records.

After the move from San Francisco to New York, Marley (450) spends several weeks house-hunting before finding an ideal residence. In aid of celebrating his new home, Marley (450) wants to send his new housing information to various associated entities; accordingly, Marley (450) sends the Relationship Management Service (452) a notification request including his new mailing address in New York. In processing the notification request, the Relationship Management Service (452) iterates through a list of Marley's associated entities (402-412) sending update messages in accordance with user update preferences and entity update preferences. In this particular case, only Marley's parents (402), the new employer (404), the bank (406), and the cell phone service provider (408) are to receive update messages from the Relationship Management Service (452) according to the specified user update preferences.

While processing each of those four associated entities, the Relationship Management Service (452) retrieves a corresponding entity update preference and sends the update message accordingly. For instance, a telephone or e-mail message is sent to the parents (402) and a message is e-mailed to the new employer's human resources department in conformity with the standardized human resources form. Because the bank (406) and the cell phone service provider (408) both enable updating through their respective secure online mechanisms and because Marley (450) has already provided a user name but not a password in both relationship instances, the Relationship Management Service (452) obtains passwords from Marley (450) to update both associated entities with Marley's contact information.

Through the update messages sent by the Relationship Management Service (452) on behalf of Marley (450), little manual work was required of Marley (450) in intelligently alerting the associated entities (402-408) specified according to Marley (450); consequently, the Marley (450) did not have to directly update the entities themselves nor research how to update them in the first place. As a result, the associated entities for which Marley (450) cares to have relationships with are always apprised of a current set of contact information for Marley (450) via the Relationship Management Service's update message mechanism. Further, these associated entities, should they want to contact Marley (450), are able to make that contact in a manner in accordance with a contact preference specific to both Marley (450) and entity.

Figure 5:
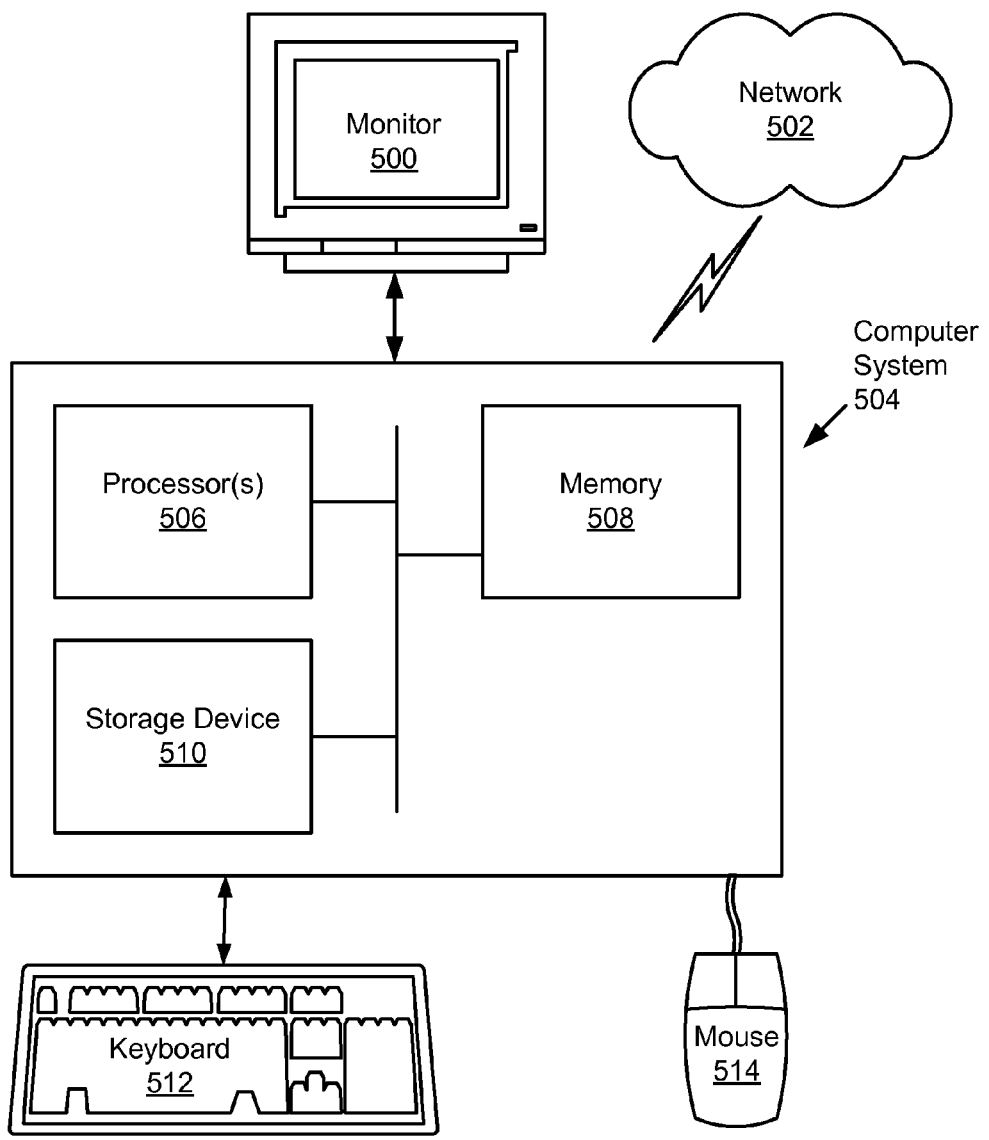
FIG. 5 shows a computer system in accordance with one or more embodiments of the invention.

Embodiments of the invention may be implemented on virtually any type of computer regardless of the platform being used. For example, as shown in FIG. 5, a computer system (504) includes one or more processors (506), associated memory (508) (e.g., random access memory (RAM), cache memory, flash memory, etc.), a storage device (510) (e.g., a hard disk, an optical drive such as a compact disk drive or digital video disk (DVD) drive, a flash memory stick, etc.), and numerous other elements and functionalities typical of today's computers (not shown). The computer system (504) may also include input means, such as a keyboard (512), a mouse (514), or a microphone (not shown). Further, the computer system (504) may include output means, such as a monitor (500) (e.g., a liquid crystal display (LCD), a plasma display, or cathode ray tube (CRT) monitor). The computer system (504) may be connected to a network (502) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (504) includes at least the minimal processing, input, and/or output means necessary to practice embodiments of the invention.

Further, those skilled in the art will appreciate that one or more elements of the aforementioned computer system (504) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing relationships, comprising:
generating, by a relationship management service executing on a hardware processor, a list of entities that a first registered user has a relationship by:
obtaining a credit card statement from the first registered user,
extracting a list of merchants listed on the credit card statement, and
for each merchant in the list of merchants:
sending a first relationship confirmation request to the first registered user to confirm the relationship, and
adding the merchant to the list of entities when a relationship confirmation is received from the first registered user in response to the first relationship confirmation request;
receiving, by the relationship management service, a notification request comprising contact information for the first registered user, wherein the contact information comprises a physical mailing address;
identifying, by the relationship management service, a first associated entity from the list of entities;

retrieving, by the relationship management service, a first user update preference associated with the first registered user and the first associated entity from a persistent storage device, wherein the first user update preference specifies whether the first associated entity receives a first update message following a change in the contact information for the first registered user;

retrieving, by the relationship management service, a first entity update preference associated with the first associated entity from the persistent storage device, wherein the first entity update preference specifies a first requirement for sending the first associated entity the first update message;

making a first determination, by the relationship management service, that the first user update preference permits sending the first update message to the first associated entity;

based on the first determination:
 creating, by the relationship management service, the first update message,
  wherein the first update message comprises the contact information, and
  wherein the first update message is formatted according to the first requirement; and
 sending, by the relationship management service, the first update message to the first associated entity based on the first entity update preference;

identifying, by the relationship management service, a second associated entity from the list of entities, wherein the second associated entity is in the list of merchants extracted from the credit card statement;

retrieving, by the relationship management service, a second user update preference associated with the first registered user and the second associated entity from the persistent storage device, wherein the second user update preference specifies that the second associated entity receives an update following the change in the contact information for the first registered user;

retrieving, by the relationship management service, a second entity update preference associated with the second associated entity from the persistent storage device, wherein the second entity update preference specifies an online form, managed by the second associated entity, for updating contact information for the user;

obtaining, by the relationship management service, a username and a password corresponding to the first registered user and required to access the online form; and updating the second associated entity via the online form using the username and the password.

2. The method of claim 1, further comprising:
identifying, by the relationship management service, a third associated entity with which the first registered user has a relationship;
retrieving, by the relationship management service, a third user update preference associated with the first registered user and the third associated entity from the persistent storage device, wherein the third user update preference specifies whether the third associated entity receives a second update message following the change in the contact information for the first registered user;
retrieving, by the relationship management service, a third entity update preference associated with the third associated entity from the persistent storage device, wherein the third entity update preference specifies a second requirement for sending the third associated entity the second update message;

making a second determination, by the relationship management service, that the third user update preference permits sending the second update message to the third associated entity;
based on the second determination:
 creating, by the relationship management service, the second update message,
  wherein the second update message comprises the contact information, and
  wherein the second update message is formatted according to the second requirement; and
 sending, by the relationship management service, the second update message to the third associated entity based on the third entity update preference.

3. The method of claim 1, further comprising:
identifying, by the relationship management service, a third associated entity with which the first registered user has a relationship;
retrieving, by the relationship management service, a third user update preference associated with the first registered user and the third associated entity from the persistent storage device, wherein the third user update preference specifies whether the third associated entity receives a second update message following the change in the contact information for the first registered user;
retrieving, by the relationship management service, a third entity update preference associated with the third associated entity from the persistent storage device, wherein the third entity update preference specifies a second requirement for sending the third associated entity the second update message; and
making a second determination, by the relationship management service, that the third user update preference denies sending the second update message to the third associated entity.

4. The method of claim 1, further comprising:
receiving, by the relationship management service from an unregistered user, a registration request comprising a third associated entity with which the unregistered user has a relationship, a third user update preference associated with the unregistered user and the third associated entity, and a contact preference associated with the unregistered user and the third associated entity,
 wherein the third user update preference specifies whether the third associated entity receives a second update message following the change in the contact information for the unregistered user, and
 wherein the contact preference determines whether the third associated entity is one which the unregistered user prefers receiving contact from;
retrieving, by the relationship management service, a third entity update preference from the persistent storage device,
 wherein the third entity update preference is associated with the third associated entity, and
 wherein the third entity update preference specifies a second requirement for sending the third associated entity the second update message;
storing, by the relationship management service using the persistent storage device, the third associated entity, the contact preference, the third entity update preference, and the third user update preference; and
registering, by the relationship management service, the unregistered user as a second registered user.

5. The method of claim 4, wherein the contact preference further determines a manner in which the second registered user is contacted by the third associated entity.

6. The method of claim 1, wherein the contact information determines a manner in which the first registered user is contacted by the first associated entity.

7. The method of claim 1, further comprising:
identifying, by the relationship management service, a third associated entity with which the first registered user has an unregistered relationship, wherein a relationship between the first registered user and the third associated entity is a registered relationship comprising a stored contact preference associated with the first registered user and the third associated entity, a stored user update preference associated with the first registered user and the third associated entity, and a stored entity update preference associated with the third associated entity;
sending, by the relationship management service, a second relationship confirmation request identifying the second associated entity to the first registered user;
receiving, by the relationship management service from the first registered user, a relationship confirmation response affirming the relationship with the third associated entity;
retrieving, by the relationship management service, a third entity update preference associated with the third associated entity;
determining, by the relationship management service, a third user update preference associated with the first registered user and the third associated entity;
determining, by the relationship management service, a contact preference associated with the first registered user and the third associated entity; and
storing the third associated entity, the contact preference, the third entity update preference, and the third user update preference by the relationship management service using the persistent storage device.

8. The method of claim 7, wherein the contact preference associated with the first registered user and the third associated entity determines a manner in which the first registered user receives contact information from the third associated entity.

9. The method of claim 7, wherein identifying, by the relationship management service, that the third associated entity has an unregistered relationship with the first registered user comprises searching, by the relationship management service, a network for content information associated with the first registered user.

10. The method of claim 7, wherein identifying, by the relationship management service, that the third associated entity has an unregistered relationship with the first registered user comprises importing, by the relationship management service, content information associated with the first registered user from other software.

11. The method of claim 7, wherein identifying, by the relationship management service, that the third associated entity has an unregistered relationship with the first registered user comprises receiving, by the relationship management service, a relationship request from the third associated entity.

12. A relationship management service comprising:
a hardware processor and memory storing software instructions configured to:
generate a list of entities that a first registered user has a relationship by:
obtaining a credit card statement from the first registered user,
extracting a list of merchants listed on the credit card statement, and
for each merchant in the list of merchants:
sending a first relationship confirmation request to the first registered user to confirm the relationship, and
adding the merchant to the list of entities when a relationship confirmation is received from the first registered user in response to the first relationship confirmation request;
receive, using the hardware processor, a notification request comprising contact information for the first registered user, wherein the contact information comprises a physical mailing address;
identify, using the hardware processor, a first associated entity from the list of entities;
retrieve, using the hardware processor, a first user update preference associated with the first registered user and the first associated entity from a persistent storage device, wherein the first user update preference specifies whether the first associated entity receives a first update message following a change in the contact information for the first registered user;
retrieve, using the hardware processor, a first entity update preference associated with the first associated entity from the persistent storage device, wherein the first entity update preference specifies a first requirement for sending the first associated entity the first update message;
make a first determination, using the hardware processor, that the first user update preference permits sending the first update message to the first associated entity;
based on the first determination:
create, using the hardware processor, the first update message, wherein the first update message comprises the contact information, and wherein the first update message is formatted according to the first requirement; and
send, using the hardware processor, the first update message to the first associated entity based on the first entity update preferences
identify a second associated entity from the list of entities, wherein the second associated entity is in the list of merchants extracted from the credit card statement;
retrieve a second user update preference associated with the first registered user and the second associated entity from the persistent storage device, wherein the second user update preference specifies that the second associated entity receives an update following the change in the contact information for the first registered user;
retrieve a second entity update preference associated with the second associated entity from the persistent storage device, wherein the second entity update preference specifies an online form, managed by the second associated entity, for updating contact information for the user;
obtain a username and a password corresponding to the first registered user and required to access the online form; and
update the second associated entity via the online form using the username and the password.

13. The relationship management service of claim 12, further comprising software instructions configured to:
identify, using the hardware processor, a third associated entity with which the first registered user has a relationship;
retrieve, using the hardware processor, a third user update preference associated with the first registered user and the third associated entity from the persistent storage device, wherein the third user update preference specifies whether the third associated entity receives a second update message following the change in the contact information for the first registered user;

retrieve, using the hardware processor, a third entity update preference associated with the third associated entity from the persistent storage device, wherein the third entity update preference specifies a second requirement for sending the third associated entity the second update message;

make a second determination, using the hardware processor, that the third user update preference permits sending the second update message to the third associated entity;

based on the second determination:

create, using the hardware processor, the second update message, wherein the second update message comprises the contact information, and wherein the second update message is formatted according to the second requirement; and send, using the hardware processor, the second update message to the third associated entity based on the third entity update preference.

14. The relationship management service of claim 12, further comprising software instructions configured to:

identify, using the hardware processor, a third associated entity with which the first registered user has a relationship;

retrieve, using the hardware processor, a third user update preference associated with the first registered user and the third associated entity from the persistent storage device, wherein the third user update preference specifies whether the third associated entity receives a second update message following the change in the contact information for the first registered user;

retrieve, using the hardware processor, a third entity update preference associated with the third associated entity from the persistent storage device, wherein the third entity update preference specifies a second requirement for sending the third associated entity the second update message; and determine, using the hardware processor, that the third user update preference denies sending the second update message to the third associated entity.

15. The relationship management service of claim 12, further comprising software instructions configured to:

receive, using the hardware processor from an unregistered user, a registration request comprising a third associated entity with which the unregistered user has a relationship, a third user update preference associated with the unregistered user and the third associated entity, and a contact preference associated with the unregistered user and the third associated entity;

retrieve, using the hardware processor, a third entity update preference from the persistent storage device, wherein the third entity update preference is associated with the third associated entity;

store, using the hardware processor, the third associated entity, the contact preference, the third entity update preference, and the third user update preference using the persistent storage device; and register, using the hardware processor, the unregistered user as a second registered user.

16. The relationship management service of claim 15, wherein the contact preference determines a manner in which the second registered user is contacted by the third associated entity.

17. The relationship management service of claim 12, wherein the contact information determines a manner in which the first registered user is contacted by the first associated entity.

18. The relationship management service of claim 12, further comprising software instructions configured to:

identify, using the hardware processor, a third associated entity with which the first registered user has an unregistered relationship, wherein a relationship between the first registered user and the third associated entity is registered relationship comprising a stored contact preference associated with the first registered user and the third associated entity, a stored user update preference associated with the first registered user and the third associated entity, and a stored entity update preference associated with the third associated entity;

send, using the hardware processor, a second relationship confirmation request identifying the third associated entity to the first registered user;

receive, from the first registered user using the hardware processor, a relationship confirmation response affirming the relationship with the third associated entity from the persistent storage device;

retrieve, using the hardware processor, a third entity update preference associated with the third associated entity from the persistent storage device;

determine, using the hardware processor, a third user update preference associated with the first registered user and the third associated entity;

determine, using the hardware processor, a contact preference associated with the first registered user and the third associated entity; and store, using the hardware processor, the third associated entity, the contact preference, the third entity update preference, and the third user update preference using the persistent storage device.

19. The relationship management service of claim 18, wherein the contact preference associated with the first registered user and the third associated entity specifies a manner in which the first registered user receives contact information from the third associated entity.

20. A non-transitory computer readable medium comprising executable software instructions for managing relationships, wherein executable software instructions are configured to:

generate a list of entities that a first registered user has a relationship by:

obtaining a credit card statement from the first registered user, extracting a list of merchants listed on the credit card statement, and for each merchant in the list of merchants:

sending a first relationship confirmation request to the first registered user to confirm the relationship, and adding the merchant to the list of entities when a relationship confirmation is received from the first registered user in response to the first relationship confirmation request;

receive a notification request comprising contact information for the first registered user, wherein the contact information comprises a physical mailing address;

identify a first associated entity from the list of entities;

retrieve a first user update preference associated with the first registered user and the first associated entity, wherein the first user update preference specifies whether the first associated entity receives a first update message following a change in the contact information for the first registered user;

retrieve a first entity update preference associated with the first associated entity, wherein the first entity update preference specifies a first requirement for sending the first associated entity the first update message;

make a first determination that the first user update preference permits sending the first update message to the first associated entity;

based on the first determination:
  create the first update message,
    wherein the first update message comprises the contact information, and
    wherein the first update message is formatted according to the first requirement; and
  send the first update message to the first associated entity based on the first entity update preference identify, by the relationship management service, a second associated entity from the list of entities, wherein the second associated entity is in the list of merchants extracted from the credit card statement;

retrieve, by the relationship management service, a second user update preference associated with the first registered user and the second associated entity from the persistent storage device, wherein the second user update preference specifies that the second associated entity receives an update following the change in the contact information for the first registered user;

retrieve, by the relationship management service, a second entity update preference associated with the second associated entity from the persistent storage device, wherein the second entity update preference specifies an online form, managed by the second associated entity, for updating contact information for the user;

obtain, by the relationship management service, a username and a password corresponding to the first registered user and required to access the online form; and update the second associated entity via the online form using the username and the password.

21. The non-transitory computer readable medium of claim 20, wherein the contact information determines a manner in which the first registered user is contacted by the first associated entity.

22. The non-transitory computer readable medium of claim 20, wherein the first entity update preference associated with the first associated entity specifies a manner in which the first associated entity receives update messages.

\* \* \* \* \*